United States Patent
Yeh

(10) Patent No.: US 11,816,355 B2
(45) Date of Patent: Nov. 14, 2023

(54) DATA WRITING METHOD BASED ON DIFFERENT NUMBERS OF CHIP ENABLED REGIONS, MEMORY STORAGE DEVICE AND MEMORY CONTROL CIRCUIT UNIT

(71) Applicant: PHISON ELECTRONICS CORP., Miaoli (TW)

(72) Inventor: Chih-Kang Yeh, Kinmen County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 17/213,152

(22) Filed: Mar. 25, 2021

(65) Prior Publication Data
US 2022/0283740 A1 Sep. 8, 2022

(30) Foreign Application Priority Data
Mar. 2, 2021 (TW) .................................. 110107206

(51) Int. Cl.
*G06F 3/06* (2006.01)

(52) U.S. Cl.
CPC .......... *G06F 3/0659* (2013.01); *G06F 3/0604* (2013.01); *G06F 3/0647* (2013.01); *G06F 3/0679* (2013.01)

(58) Field of Classification Search
CPC .... G06F 3/0659; G06F 3/0604; G06F 3/0647; G06F 3/0679
See application file for complete search history.

(56) References Cited

U.S. PATENT DOCUMENTS

| | | | | |
|---|---|---|---|---|
| 8,244,965 | B2 * | 8/2012 | Huang | G06F 12/0246 |
| | | | | 711/E12.016 |
| 11,216,334 | B1 * | 1/2022 | Wang | G06F 12/0246 |
| 2013/0024604 | A1 * | 1/2013 | Yeh | G06F 12/0246 |
| | | | | 711/E12.008 |
| 2022/0100373 | A1 * | 3/2022 | Ke | G06F 11/076 |

FOREIGN PATENT DOCUMENTS

| | | | | | |
|---|---|---|---|---|---|
| CN | 110837339 | A | * | 2/2020 | .......... G06F 3/0638 |
| CN | 113467699 | A | * | 3/2020 | .......... G06F 3/0652 |
| CN | 108197199 | B | * | 10/2021 | .......... G06F 16/254 |
| TW | 201135740 | | | 10/2011 | |

OTHER PUBLICATIONS

Office Action of Taiwan Counterpart Application, dated Dec. 27, 2021, pp. 1-7.

* cited by examiner

*Primary Examiner* — Charles Rones
*Assistant Examiner* — Alexander Vinnitsky
(74) *Attorney, Agent, or Firm* — JCIPRNET

(57) ABSTRACT

A memory control method, a memory storage device, and a memory control circuit unit are provided. The method includes receiving first data from a host system; sending a first write command sequence instructing continuous writing of the first data to a plurality of first chip enabled (CE) regions in response to the memory storage device being in a first state; receiving second data from the host system; and sending a second write command sequence instructing continuous writing of the second data to at least one second CE region in response to the memory storage device being in a second state. A data amount of the first data is equal to a data amount of the second data. A total number of the first CE regions is greater than a total number of the at least one second CE region.

15 Claims, 11 Drawing Sheets

DATA WRITING METHOD BASED ON DIFFERENT NUMBERS OF CHIP ENABLED REGIONS, MEMORY STORAGE DEVICE AND MEMORY CONTROL CIRCUIT UNIT

CROSS-REFERENCE TO RELATED APPLICATION

This application claims the priority benefit of Taiwan application serial no. 110107206, filed on Mar. 2, 2021. The entirety of the above-mentioned patent application is hereby incorporated by reference herein and made a part of this specification.

BACKGROUND

Technical Field

The disclosure relates to a memory control method, and in particular, relates to a memory control method, a memory storage device, and a memory control circuit unit.

Description of Related Art

In recent years, the markets of digital cameras, mobiles phones, and MP3 players have expanded rapidly, resulting in escalating demand for storage media by consumers. The rewritable non-volatile memory modules (e.g., a flash memory) are ideal for being built in the portable multimedia devices as mentioned above thanks to characteristics such as data non-volatility, low power consumption, compact sizes, and absence of a mechanical structure.

Generally, the rewritable non-volatile memory module in a memory storage device uses a channel as a unit to manage each physical block in the rewritable non-volatile memory module. Nevertheless, such a management method may be rigid in some situations, and accessing performance of the memory storage device may be limited as a result.

SUMMARY

The disclosure provides a memory control method, a memory storage device, and a memory control circuit unit through which a memory storage device may be flexibly managed.

An exemplary embodiment of the disclosure provides a memory control method configured to control a memory storage device. The memory storage device includes a rewritable non-volatile memory module. The rewritable non-volatile memory module includes a plurality of chip enabled (CE) regions. The memory control method includes the following steps. First data is received from a host system. In response to the memory storage device being in a first state, a first write command sequence is sent. The first write command sequence instructs continuous writing of the first data to a plurality first CE regions among the CE regions. Second data is received from the host system. In response to the memory storage device being in a second state, a second write command sequence is sent. The second write command sequence instructs continuous writing of the second data to at least one second CE region among the CE regions. A data amount of the first data is equal to a data amount of the second data. A total number of the first CE regions is greater than a total number of the at least one second CE region.

In an embodiment of the disclosure, the memory control method further includes the following step. In a period when the memory storage device performs a data merge operation, it is determined that the memory storage device is in the second state. The data merge operation includes moving of valid data in the rewritable non-volatile memory module.

In an embodiment of the disclosure, the memory control method further includes the following step. In a period when the memory storage device does not perform the data merge operation, it is determined that the memory storage device is in the first state.

In an embodiment of the disclosure, the memory control method further includes the following steps. A plurality of first physical units configured to store the first data in the first CE regions are marked as using a first write mode to store the first data. A plurality of second physical units configured to store the second data in the at least one second CE region are marked as using a second write mode to store the second data. The first write mode is different from the second write mode.

In an embodiment of the disclosure, the memory control method further includes the following steps. The first physical units are marked as continuously storing the first data. The second physical units are marked as continuously storing the second data.

In an embodiment of the disclosure, the memory control method further includes the following step. Valid data is moved according to a write mode corresponding to the valid data stored in the rewritable non-volatile memory module in a data merge operation to keep continuity of the moved valid data.

An exemplary embodiment of the disclosure further provides a memory storage device including a connection interface unit, a rewritable non-volatile memory module, and a memory control circuit unit. The connection interface unit is configured to be coupled to a host system. The rewritable non-volatile memory module includes a plurality of CE regions. The memory control circuit unit is coupled to the connection interface unit and the rewritable non-volatile memory module. The memory control circuit unit is configured to receive first data from the host system. In response to the memory storage device being in a first state, the memory control circuit unit is further configured to send a first write command sequence instructing continuous writing of the first data to a plurality first CE regions among the CE regions. The memory control circuit unit is further configured to receive second data from the host system. In response to the memory storage device being in a second state, the memory control circuit unit is further configured to send a second write command sequence instructing continuous writing of the second data to at least one second CE region among the CE regions. A data amount of the first data is equal to a data amount of the second data. A total number of the first CE regions is greater than a total number of the at least one second CE region.

In an embodiment of the disclosure, the memory control circuit unit is further configured to determine that the memory storage device is in the second state in a period when the memory storage device performs a data merge operation. The data merge operation includes moving of valid data in the rewritable non-volatile memory module.

In an embodiment of the disclosure, the memory control circuit unit is further configured to determine that the memory storage device is in the first state in a period when the memory storage device does not perform the data merge operation.

In an embodiment of the disclosure, the memory control circuit unit is further configured to mark a plurality of first physical units configured to store the first data in the first CE regions as using a first write mode to store the first data. The memory control circuit unit is further configured to mark a plurality of second physical units configured to store the second data in the at least one second CE region as using a second write mode to store the second data. The first write mode is different from the second write mode.

In an embodiment of the disclosure, the memory control circuit unit is further configured to mark the first physical units as continuously storing the first data. The memory control circuit unit is further configured to mark the second physical units as continuously storing the second data.

In an embodiment of the disclosure, in a data merge operation, the memory control circuit unit is further configured to move valid data according to a write mode corresponding to the valid data stored in the rewritable non-volatile memory module to keep continuity of the moved valid data.

An exemplary embodiment of the disclosure further provides a memory control circuit unit including a host interface, a memory interface, and a memory management circuit. The host interface is configured to be coupled to a host system. The memory interface is configured to be coupled to a rewritable non-volatile memory module including a plurality of CE regions. The memory management circuit is coupled to the host interface and the memory interface. The memory management circuit is configured to receive first data from the host system. In response to the memory storage device being in a first state, the memory management circuit is further configured to send a first write command sequence instructing continuous writing of the first data to a plurality first CE regions among the CE regions. The memory management circuit is further configured to receive second data from the host system. In response to the memory storage device being in a second state, the memory management circuit is further configured to send a second write command sequence instructing continuous writing of the second data to at least one second CE region among the CE regions. A data amount of the first data is equal to a data amount of the second data. A total number of the first CE regions is greater than a total number of the at least one second CE region.

In an embodiment of the disclosure, the memory management circuit is further configured to determine that the memory control circuit unit is in the second state in a period when the memory control circuit unit performs a data merge operation. The data merge operation includes moving of valid data in the rewritable non-volatile memory module.

In an embodiment of the disclosure, the memory management circuit is further configured to determine that the memory control circuit unit is in the first state in a period when the memory control circuit unit does not perform the data merge operation.

In an embodiment of the disclosure, the memory management circuit is further configured to mark a plurality of first physical units configured to store the first data in the first CE regions as using a first write mode to store the first data. The memory management circuit is further configured to mark a plurality of second physical units configured to store the second data in the at least one second CE region as using a second write mode to store the second data. The first write mode is different from the second write mode.

In an embodiment of the disclosure, the memory management circuit is further configured to mark the first physical units as continuously storing the first data. The memory management circuit is further configured to mark the second physical units as continuously storing the second data.

In an embodiment of the disclosure, in a data merge operation, the memory management circuit is further configured to move valid data according to a write mode corresponding to the valid data stored in the rewritable non-volatile memory module to keep continuity of the moved valid data.

In an embodiment of the disclosure, a data writing order of the first data in the first CE regions is different from a data writing order of the second data in the at least one second CE region.

To sum up, in response to the memory storage device being in the first state, the first data may be continuously written to the first CE regions in the rewritable non-volatile memory module. In response to the memory storage device being in the second state, the second data may be continuously written to the at least one second CE region in the rewritable non-volatile memory module. The data amount of the first data is equal to the data amount of the second data. The total number of the first CE regions is greater than the total number of the at least one second CE region. By flexibly managing the rewritable non-volatile memory module (or the memory storage device) in different states in the memory storage device, the overall accessing performance of the memory storage device may be improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Generally, a memory storage device (aka a memory storage system) includes a rewritable non-volatile memory module and a controller (aka a control circuit). The memory storage device is usually used together with a host system, such that the host system can write data into or read data from the memory storage device.

Figure 1:
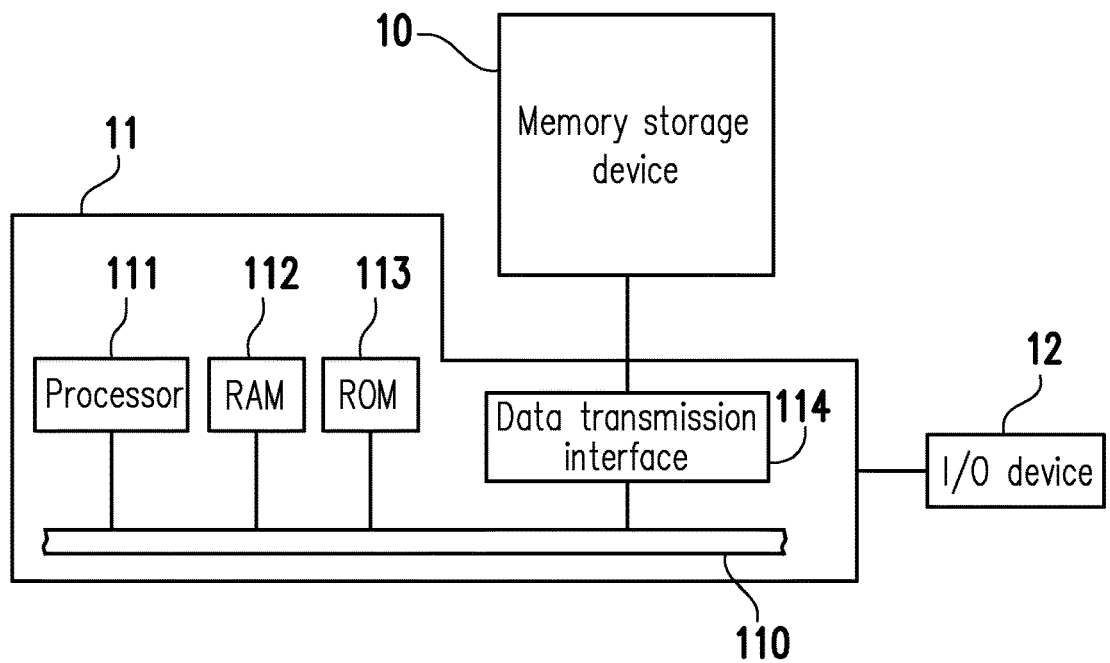
FIG. 1 is a schematic view illustrating a host system, a memory storage device, and an input/output (I/O) device according to an exemplary embodiment of the disclosure.
Figure 2:
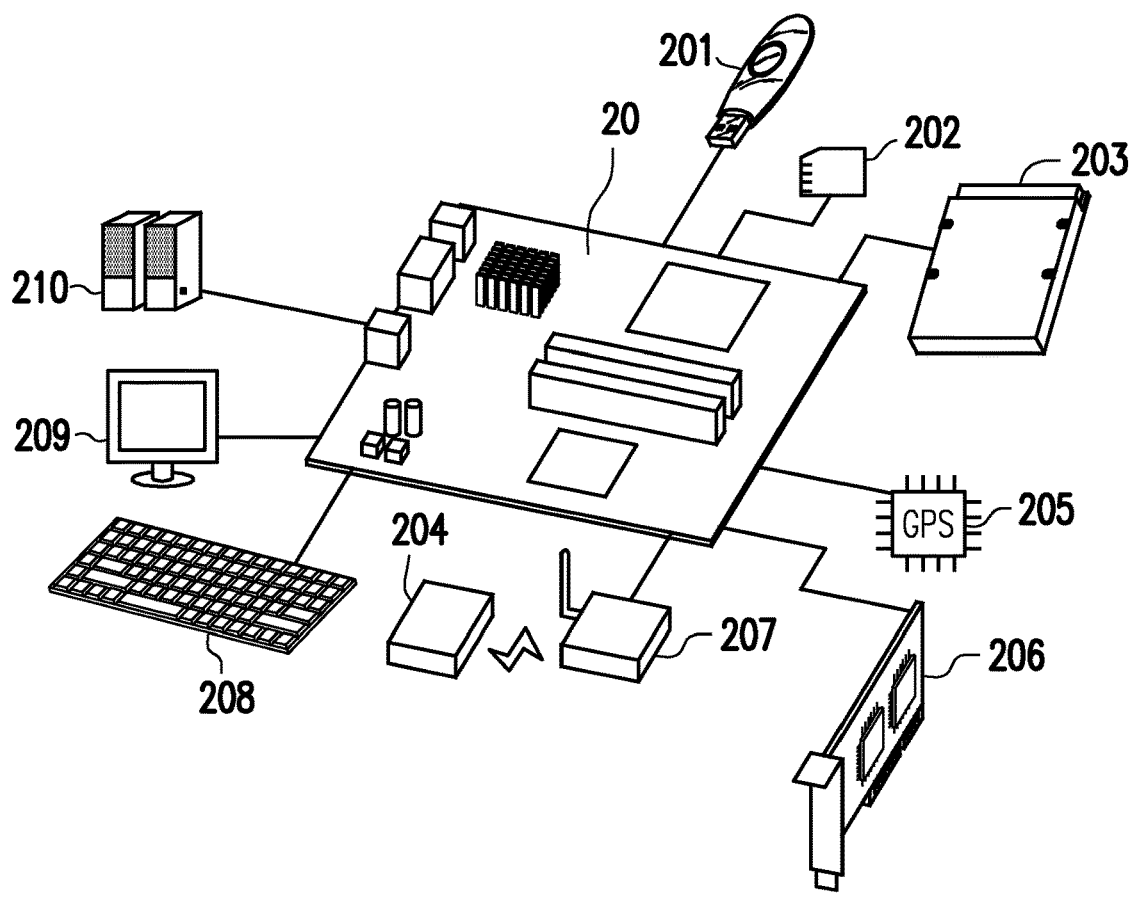
FIG. 2 is a schematic view illustrating a host system, a memory storage device, and an I/O device according to an exemplary embodiment of the disclosure.

FIG. 1 is a schematic view illustrating a host system, a memory storage device, and an input/output (I/O) device according to an exemplary embodiment of the disclosure. FIG. 2 is a schematic view illustrating a host system, a memory storage device, and an I/O device according to an exemplary embodiment of the disclosure.

Referring to FIG. 1 and FIG. 2 together, a host system 11 generally includes a processor 111, a random access memory (RAM) 112, a read only memory (ROM) 113, and a data transmission interface 114. The processor 111, the random access memory 112, the read only memory 113, and the data transmission interface 114 are all coupled to a system bus 110.

In an exemplary embodiment, the host system 11 is coupled to a memory storage device 10 through the data transmission interface 114. For instance, the host system 11 is able to store data into the memory storage device 10 or read data from the memory storage device 10 through the data transmission interface 114. Further, the host system 11 is coupled to an I/O device 12 through the system bus 110. For instance, the host system 11 may transmit an output signal to the I/O device 12 or receive an input signal from the I/O device 12 through the system bus 110.

In an exemplary embodiment, the processor 111, the random access memory 112, the read only memory 113, and the data transmission interface 114 may be disposed on a mainboard 20 of the host system 11. A number of the data transmission interface 114 may be one or plural. The mainboard 20 may be coupled to the memory storage device 10 by wired or wireless means through the data transmission interface 114. The memory storage device 10 may be, for example, a flash drive 201, a memory card 202, a solid state drive (SSD) 203, or a wireless memory storage device 204. The wireless memory storage device 204 may be, for example, a memory storage device based on various wireless communication technologies, such as a near field communication (NFC) memory storage device, a wireless fidelity (WiFi) memory storage device, a Bluetooth memory storage device, or a low energy Bluetooth memory storage device (e.g., iBeacon). Besides, the mainboard 20 may also be coupled to various I/O devices including a global positioning system (GPS) module 205, a network interface card 206, a wireless transmission device 207, a keyboard 208, a monitor 209, and a speaker 210 through the system bus 110. For example, in an exemplary embodiment, the mainboard 20 may access the wireless memory storage device 204 through the wireless transmission device 207.

Figure 3:
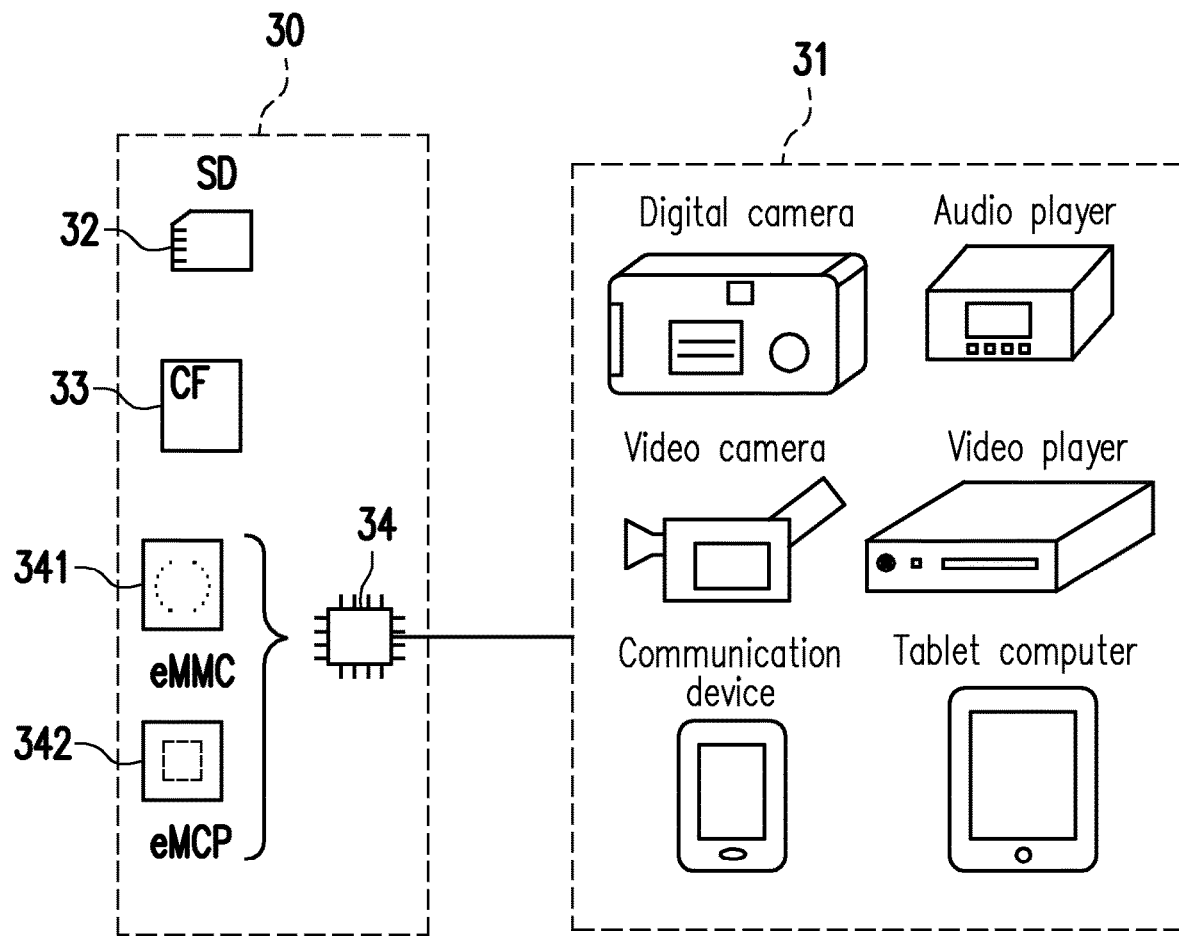
FIG. 3 is a schematic view illustrating a host system and a memory storage device according to an exemplary embodiment of the disclosure.

In an exemplary embodiment, the host system mentioned may be any systems capable of substantially cooperating with the memory storage device for storing data. Although the host system is illustrated as a computer system in the foregoing exemplary embodiment; nevertheless, FIG. 3 is a schematic view illustrating a host system and a memory storage device according to an exemplary embodiment of the disclosure. With reference to FIG. 3, in another exemplary embodiment, a host system 31 may also be a system including a digital camera, a video camera, a communication device, an audio player, a video player or a tablet computer, whereas a memory storage device 30 may be various non-volatile memory storage devices used by the host system 31, such as a secure digital (SD) card 32, a compact flash (CF) card 33, or an embedded storage device 34. The embedded storage device 34 includes various embedded storage devices capable of directly coupling a memory module onto a substrate of the host system, such as an embedded Multi Media Card (eMMC) 341 and/or an embedded Multi Chip Package (eMCP) storage device 342.

Figure 4:
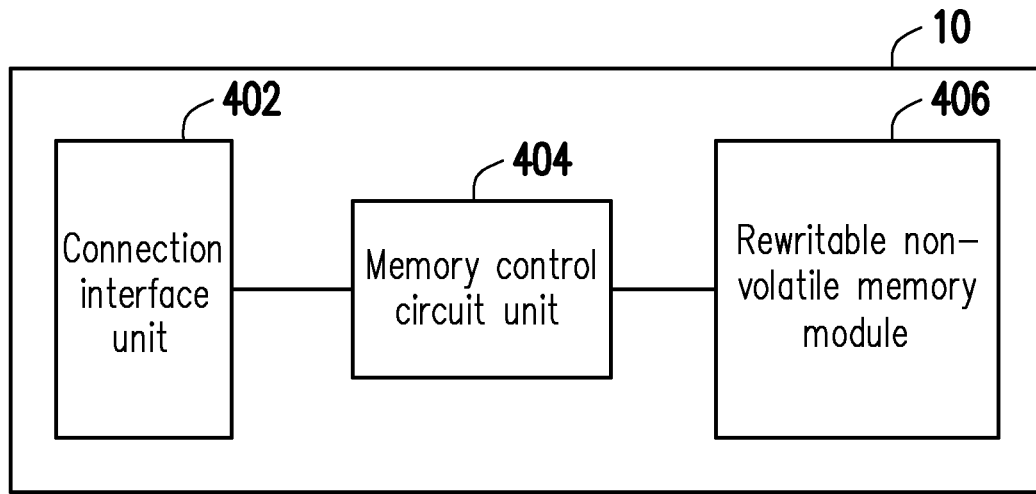
FIG. 4 is a schematic block view illustrating a memory storage device according to an exemplary embodiment of the disclosure.

FIG. 4 is a schematic block view illustrating a memory storage device according to an exemplary embodiment of the disclosure. With reference to FIG. 4, the memory storage device 10 includes a connection interface unit 402, a memory control circuit unit 404, and a rewritable non-volatile memory module 406.

The connection interface unit 402 is configured to couple the memory storage device 10 to the host system 11. The memory storage device 10 may communicate with the host system 11 through the connection interface unit 402. In an exemplary embodiment, the connection interface unit 402 is compatible with a Serial Advanced Technology Attachment (SATA) standard. However, it should be noted that the disclosure is not limited thereto, and the connection interface unit 402 may also comply with the Parallel Advanced Technology Attachment (PATA) standard, the Institute of Electrical and Electronic Engineers (IEEE) 1394 standard, the Peripheral Component Interconnect Express (PCI Express) standard, the Universal Serial Bus (USB) standard, the Secure Digital (SD) interface standard, the Ultra High Speed-I (UHS-I) interface standard, the Ultra High Speed-II (UHS-II) interface standard, the Memory Stick (MS) interface standard, the Multi Chip Package (MCP) interface standard, the Multi Media Card (MMC) interface standard, the Embedded Multimedia Card (eMMC) interface standard, the Universal Flash Storage (UFS) interface standard, the embedded Multi Chip Package (eMCP) interface standard, the Compact Flash (CF) interface standard, the Integrated Device Electronics (IDE) interface standard, or other suitable standards. The connection interface unit 402 may be packaged in a chip together with the memory control circuit unit 404, or the connection interface unit 402 may be disposed outside a chip including the memory control circuit unit 404.

The memory control circuit unit 404 is configured to execute a plurality of logic gates or control instructions which are implemented in a form of hardware or firmware and to execute operations of writing, reading or erasing data in the rewritable non-volatile memory module 406 according to the commands of the host system 11.

The rewritable non-volatile memory module 406 is coupled to the memory control circuit unit 404 and is configured to store data written by the host system 11. The rewritable non-volatile memory module 406 may be a single level cell (SLC) NAND flash memory module (i.e., a flash memory module capable of storing 1 bit in one memory cell), a multi level cell (MLC) NAND flash memory module (i.e., a flash memory module capable of storing 2 bits in one memory cell), a triple level cell (TLC) NAND flash memory module (i.e., a flash memory module capable of storing 3 bits in one memory cell), a qua level cell (QLC) NAND flash memory module (i.e., a flash memory module capable of storing 4 bits in one memory cell), other flash memory modules, or any memory module having the same features.

Each memory cell in the rewritable non-volatile memory module 406 stores one bit or more bits by change of a voltage (referred to as "threshold voltage" hereinafter). Specifically, a charge trapping layer is provided between a control gate of each memory cell and a channel. By applying a write voltage to the control gate, an electron amount of the charge trapping layer may be changed, and the threshold voltage of the memory cell is thereby changed. The operation of changing the threshold voltage of the memory cell is also called "writing data to the memory cell" or "programming the memory cell". Each memory cell in the rewritable non-volatile memory module 406 has a plurality of storage states according to the change of the threshold voltage. The storage state of the memory cell may be determined by applying a reading voltage, and the one or more bits stored in the memory cell are thereby obtained.

In an exemplary embodiment, the memory cells of the rewritable non-volatile memory module 406 may form a plurality of physical programming units, and the physical programming units may form a plurality of physical erasing units. Specifically, the memory cells on the same word line may form one physical programming unit or a plurality of physical programming units. If each of the memory cells stores 2 bits or more bits, the physical programming units on the same word line may at least be categorized as a lower physical programming unit and an upper physical programming unit. For instance, a least significant bit (LSB) of one memory cell belongs to the lower physical programming unit, and a most significant bit (MSB) of one memory cell belongs to the upper physical programming unit. Generally, in a MLC NAND flash memory module, a writing speed of the lower physical programming unit may be greater than a writing speed of the upper physical programming unit, and/or reliability of the lower physical programming unit is greater than reliability of the upper physical programming unit.

In an exemplary embodiment, the physical programming units are the smallest units for programming. That is, the physical programming units are the minimum units for writing data. For example, the physical programming units may be physical pages or physical sectors. When the physical programming units are the physical pages, the physical programming units usually include a data bit region and a redundancy bit region. The data bit region includes a plurality of physical sectors for storing user data, and the redundancy bit region is configured for storing system data (e.g., management data such as an error correcting code). In an exemplary embodiment, the data bit region includes 32 physical sectors, and a size of each of the physical sectors is 512 bytes (B). However, in other exemplary embodiments, the data bit region may include 8, 16, or more or fewer physical sectors. The size of each of the physical sectors may be greater or smaller. On the other hand, the physical erasing units are the minimum units for erasing. That is, each of the physical erasing units contains the least number of memory cells to be erased together. The physical erase units are physical blocks, for example.

Figure 5:
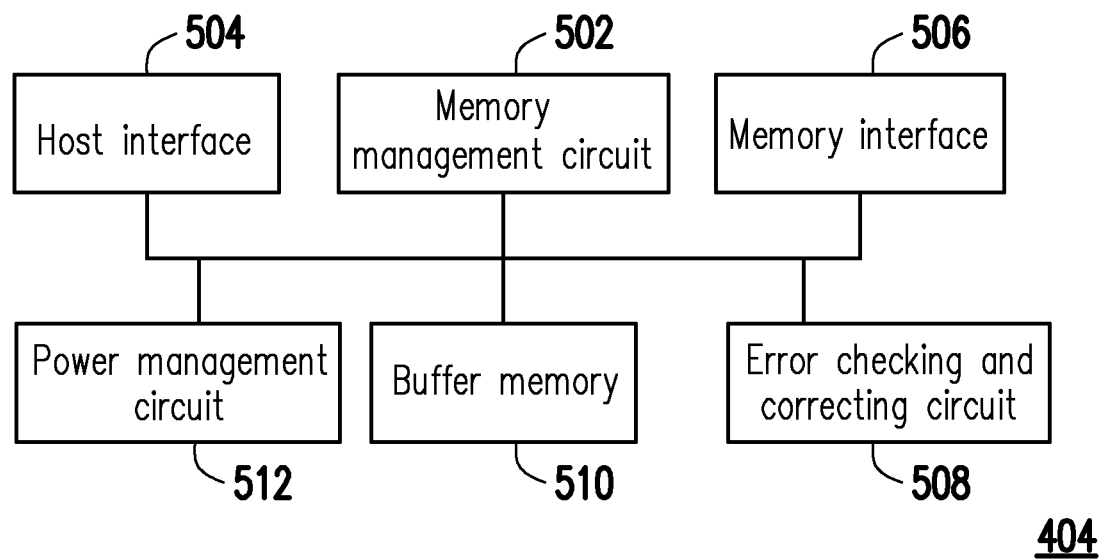
FIG. 5 is a schematic block view illustrating a memory control circuit unit according to an exemplary embodiment of the disclosure.

FIG. 5 is a schematic block view illustrating a memory control circuit unit according to an exemplary embodiment of the disclosure. With reference to FIG. 5, the memory control circuit unit 404 includes a memory management circuit 502, a host interface 504, a memory interface 506, and an error detecting and correcting circuit 508.

The memory management circuit 502 is configured to control overall operations of the memory control circuit unit 404. Specifically, the memory management circuit 502 has a plurality of control commands. When the memory storage apparatus 10 works, these control commands are executed to perform various operations such as data writing, data reading, and data erasing. The following description of the operation of the memory management circuit 502 is equivalent to the description of the operation of the memory control circuit unit 404.

In an exemplary embodiment, the control instructions of the memory management circuit 502 are implemented in a form of firmware. For instance, the memory management circuit 502 has a microprocessor unit (not shown) and a read-only memory (not shown), and these control commands are burnt into the read-only memory. When the memory storage device 10 works, the control commands are executed by the microprocessor unit for performing various operations, such as data writing, data reading, and data erasing.

In another exemplary embodiment, the control commands of the memory management circuit 502 may also be stored in a specific region (for example, a system region in the memory module exclusively used for storing system data) of the rewritable non-volatile memory module 406 in a form of program codes. Moreover, the memory management circuit 502 has the microprocessor unit (not shown), the read-only memory (not shown), and a random access memory (not shown). In particular, the read-only memory has a boot code. When the memory control circuit unit 404 is enabled, the boot code is executed first by the microprocessor unit for loading the control commands stored in the rewritable non-volatile memory module 406 to the random access memory of the memory management circuit 502. Afterwards, the microprocessor unit executes these control commands for various operations such as data writing, data reading, and data erasing.

In addition, in another exemplary embodiment, the control commands of the memory management circuit 502 may be implemented in a form of hardware. For instance, the memory management circuit 502 includes a microprocessor, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are coupled to the microprocessor. The memory cell management circuit is configured to manage the memory cells or the memory cell groups of the rewritable non-volatile memory module 406. The memory writing circuit is configured to issue a write command sequence to the rewritable non-volatile memory module 406 so as to write data into the rewritable non-volatile memory module 406. The memory reading circuit is configured to issue a read command sequence to the rewritable non-volatile memory module 406 so as to read data from the rewritable non-volatile memory module 406. The memory erasing circuit is configured to issue an erase command sequence to the rewritable non-volatile memory module 406 so as to erase data from the rewritable non-volatile memory module 406. The data processing circuit is configured to process data to be written into the rewritable non-volatile memory module 406 and data to be read from the rewritable non-volatile memory module 406. Each of the write command sequence, the read command sequence, and the erase command sequence may include one or more program codes or command codes and may be configured to instruct the rewritable non-volatile memory module 406 to execute corresponding operations such as data writing, data reading, and data erasing. In an exemplary embodiment, the memory management circuit 502 may further issue other types of command sequences to the rewritable non-volatile memory module 406 for instructing execution of corresponding operations.

The host interface 504 is coupled to the memory management circuit 502. The memory management circuit 502 may communicate with the host system 11 through the host interface 504. The host interface 504 may be configured to receive and identify commands and data sent from the host system 11. For instance, the commands and the data sent from the host system 11 may be transmitted to the memory management circuit 502 through the host interface 504. Besides, the memory management circuit 502 may transmit data to the host system 11 through the host interface 504. In an exemplary embodiment, the host interface 504 is compatible with the SATA standard. However, it should be understood that the disclosure is not limited thereto, and the host interface 504 may also be compatible to a PATA standard, an IEEE 1394 standard, a PCI Express standard, a USB standard, a SD standard, a UHS-I standard, a UHS-II standard, a MS standard, a MMC standard, an eMMC standard, a UFS standard, a CF standard, an IDE standard, or other suitable standards for data transmission.

The memory interface 506 is coupled to the memory management circuit 502 and is configured to access the rewritable non-volatile memory module 406. In other words, data to be written to the rewritable non-volatile memory module 406 is converted into a format acceptable to the rewritable non-volatile memory module 406 through the memory interface 506. To be specific, when the memory management circuit 502 is to access the rewritable non-volatile memory module 406, the memory interface 506 may send corresponding command sequences. For instance, the command sequences may include a write command sequence instructing data-writing, a read command sequence instructing data-reading, an erase command sequence instructing data-erasing, and corresponding command sequences configured for instructing various memory operations (e.g., changing reading voltage levels or executing garbage collection, etc.). The command sequences are, for example, generated by the memory management circuit 502 and sent to the rewritable non-volatile memory module 406 through the memory interface 506. The command sequences may include one or more signals or data on the bus. These signals or the data may include command codes and program codes. For example, a read command sequence includes information, such as identification code and memory address, of the reading.

The error checking and correcting circuit 508 (aka a decoding circuit) is coupled to the memory management circuit 502 and is configured to execute an error checking and correcting operation to ensure the correctness of data. To be more specific, when the memory management circuit 502 receives a write command from the host system 11, the error checking and correcting circuit 508 generates a corresponding error correcting code (ECC) and/or an error detecting code (EDC) for the data corresponding to the write command, and the memory management circuit 502 writes the data corresponding to the write command and the corresponding error correcting code and/or the error detecting code to the rewritable non-volatile memory module 406. Afterward, when the memory management circuit 502 reads the data from the rewritable non-volatile memory module 406, the corresponding error correcting code and/or the error detecting code is also read simultaneously, and the error checking and correcting circuit 508 executes error checking and correcting operations for the read data based on the error correcting code and/or the error detecting code.

In an exemplary embodiment, the memory control circuit unit 404 further includes a buffer memory 510, and a power management circuit 512. The power management unit 512 is coupled to the memory management circuit 502 and is configured to control power of the memory storage device 10. The buffer memory 510 is coupled to the memory management circuit 502 and is configured to temporarily store data and commands from the host system 11 or data from the rewritable non-volatile memory module 406.

In an exemplary embodiment, the rewritable non-volatile memory module in FIG. 4 is aka a flash memory module, the memory control circuit unit 404 is aka a flash memory controller configured to control the flash memory module, and/or the memory management circuit 502 in FIG. 5 is aka a flash memory management circuit.

Figure 6:
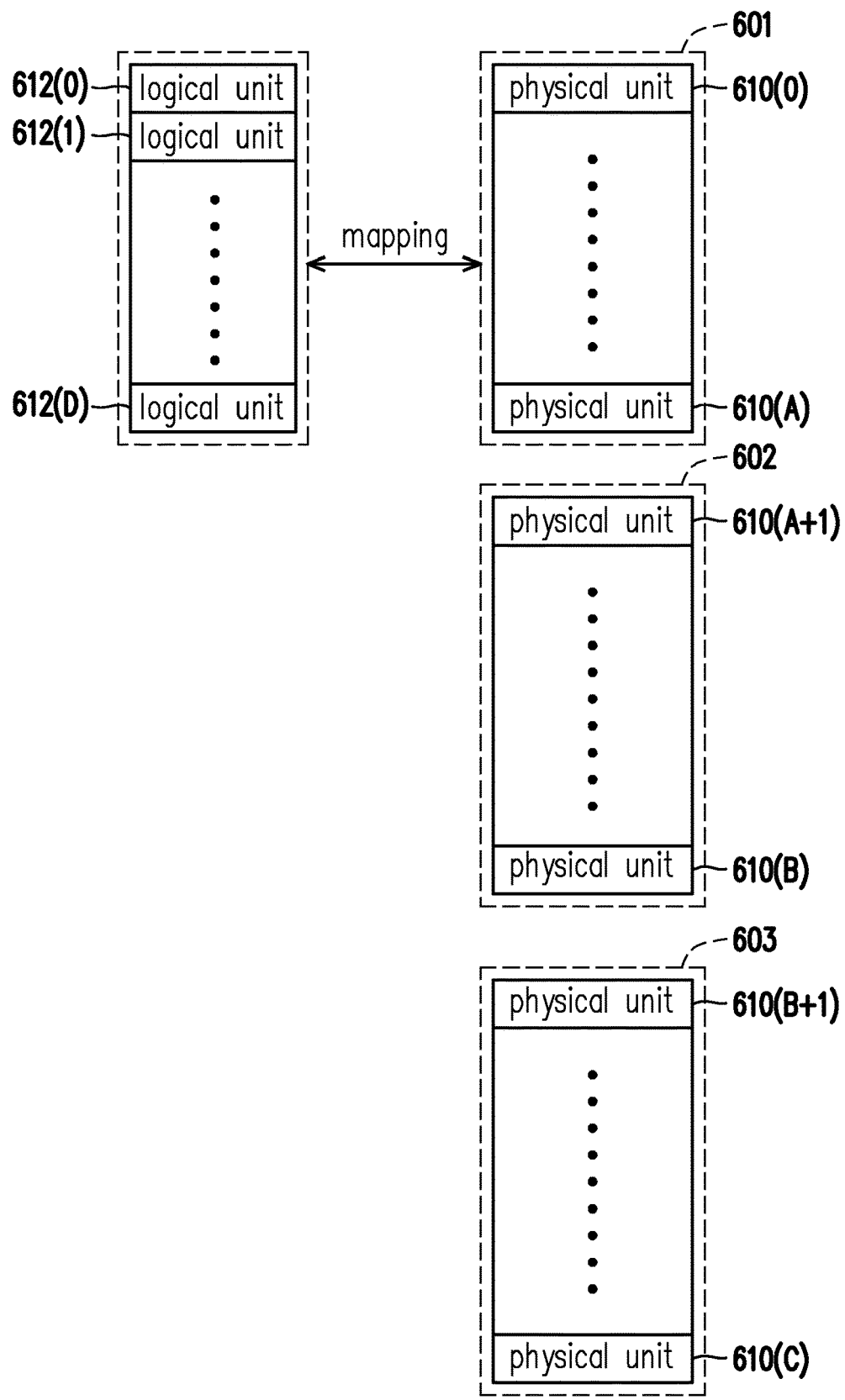
FIG. 6 is a schematic diagram illustrating management of a rewritable non-volatile memory module according to an exemplary embodiment of the disclosure.

FIG. 6 is a schematic diagram illustrating management of a rewritable non-volatile memory module according to an exemplary embodiment of the disclosure. With reference to FIG. 6, the memory management may circuit 502 logically group physical units 610(0) to 610(C) of the rewritable non-volatile memory module 406 into a storage region 601 and a spare region 602, and a system region 603. The physical units 610(0) to 610(A) in the storage region 601 are stored with data. For instance, the physical units 610(0) to 610(A) in the storage region 601 may be stored with valid data and invalid data. The physical units 610(A+1) to 610(B) in the spare region 602 are not stored with data (e.g., the valid data). The physical units 610(B+1) to 610(C) in the system region 603 are configured to store system data, such as logical-to-physical mapping tables, bad block management tables, device model, or management data of other types.

In an exemplary embodiment, one physical unit includes one or a plurality of physical erasing units. Nevertheless, in another exemplary embodiment, one physical unit may also include one or a plurality of physical programming units or is formed by one or a plurality of consecutive or inconsecutive physical addresses. When data is intended to be stored, the memory management circuit 502 may select one physical unit among the physical units 610(A+1) to 610(B) from the spare region 602 and stores the data from the host system 11 or from at least one of the physical units in the storage region 601 into the selected physical unit. At the same time, the selected physical unit is associated with the storage region 601. Besides, one of the physical units in the storage region 601 is erased, the erased physical unit is re-associated with the spare region 602, such that a new spare physical unit is formed.

The memory management circuit 502 may allocate logical units 612(0) to 612(D) to be mapped to the physical units 610(0) to 610(A) in the storage region 601. One logical unit may include one or a plurality of logical programming units and one or a plurality of logical erasing unit or may be formed by one or a plurality of consecutive or inconsecutive logical addresses. Each of the logical units 612(0) to 612(D) may be mapped to one or more physical units. Note that the memory management circuit 502 may not be provided with the logical units mapped to the system region 603, and in this way, system data stored in the system region 603 is prevented from being modified by a user.

The memory management circuit 502 may record a mapping relationship (aka logical-to-physical mapping information or mapping information) between the logical units and the physical units in at least one logical-to-physical mapping table. The logical-to-physical mapping table is stored in the physical units 610(B+1) to 610(C) of the system region 603. When the host system 11 is intended to read data from the memory storage device 10 or to write data to the memory storage device 10, the memory management circuit 502 may perform the data access operation of the memory storage device 10 according to the at least one logical-to-physical mapping table.

Note that the valid data is the latest data belonging to one logical unit, and the invalid data is not the latest data belonging to any one of the logical units. For instance, if the host system 11 stores new data into one logical unit and overwrites old data previously stored in this logical unit (i.e., updates data belonging to this logical unit), this new data stored in the storage region 601 is the latest data belonging to this logical unit and is marked as valid. Nevertheless, the overwritten old data may still be stored in the storage region 601 but is marked as invalid.

In an exemplary embodiment, if data belonging to one logical unit is updated, the mapping relationship between this logical unit and the physical unit storing the old data belonging to this logical unit is removed, and a mapping relationship between this logical unit and the physical unit storing the latest data belonging to this logical unit is established. Nevertheless, in another exemplary embodiment, if data belonging to one logical unit is updated, the mapping relationship between this logical unit and the physical unit storing the old data belonging to this logical address may still be maintained.

When the memory storage device 10 is shipped, a total number of the physical units 610(A+1) to 610(B) belonging to the spare region 602 is a predetermined number (e.g., 30). When the memory storage device 10 works, increasing physical units are selected from the spare region 602 and are associated with the storage region 601 for storing data (e.g., storing user data from the host system 11). Therefore, the total number of the physical units belonging to the spare region 602 may gradually decrease as the memory storage device 10 is used.

When the memory storage device 10 works, the memory management circuit 502 may continue to update the total number of the physical units belonging to the spare region 602. The memory management circuit 502 may start a data merge operation according to the total number of the physical units in the spare region 602 (i.e., the total number of the spare physical units). For instance, the memory management circuit 502 may determine whether the total number of the physical units belonging to the spare region 602 is less than or equal to a threshold (aka a first threshold). The first threshold value is a value of, for example, 2 or greater (e.g., 10), which is not limited by the disclosure. If the total number of the physical units belonging to the spare region 602 is less than or equal to the first threshold, the memory management circuit 502 may start the data merge operation. In an exemplary embodiment, the data merge operation is aka a garbage collection operation.

In the data merge operation, the memory management circuit 502 may select at least one of the physical units from the storage region 601 to act as a source node and selects at least one of the physical units from the spare region 602 to act as a target node. For instance, the memory management circuit 502 may select the source node according to a data amount or a data distribution of the valid data stored in at least one of the physical units in the storage region 601. The memory management circuit 502 may send at least one command sequence to instruct the rewritable non-volatile memory module 406 to move (or copy) the valid data from one or more physical units acting as the source node to one or more physical units acting as the target node. The physical unit acting as the target node and filled with the valid data may be associated with the storage region 601. If the valid data stored in one physical unit is entirely copied to the target node, this physical unit may then be erased and is associated with the spare region 602.

In an exemplary embodiment, an operation to re-associate one physical unit with the spare region 602 from the storage region 601 (or an operation to erase one physical unit) is aka releasing of one spare physical unit. Through performing the data merge operation, one or more spare physical units are released, such that the total number of the physical units belonging to the spare region 602 gradually increases.

After the data merge operation is started, if the physical units belonging to the spare region 602 meet one specific condition, the data merge operation may be stopped. For instance, the memory management circuit 502 may determine whether the total number of the physical units belonging to the spare region 602 is greater than or equal to a threshold (aka a second threshold hereinafter). For instance, the second threshold may be greater than or equal to the first threshold. If the total number of the physical units belonging to the spare region 602 is greater than or equal to the second threshold, the memory management circuit 502 may stop the data merge operation. Note that termination of the data merge operation refers to ending of the data merge operation currently being performed. After the data merge operation is stopped, if the total number of the physical units belonging to the spare region 602 is once again less than or equal to the first threshold, the next data merge operation is performed again to release the new spare physical unit.

In an exemplary embodiment, the memory management circuit 502 manages and accesses the physical units in the rewritable non-volatile memory module 406 based on management units. One management unit may also be called as one virtual block (VB). In the following exemplary embodiment, one chip enabled (CE) region in the rewritable non-volatile memory module 406 acts as an example of one management unit. Nevertheless, in another exemplary embodiment, one management unit may also include a plurality of CE regions.

Figure 7:
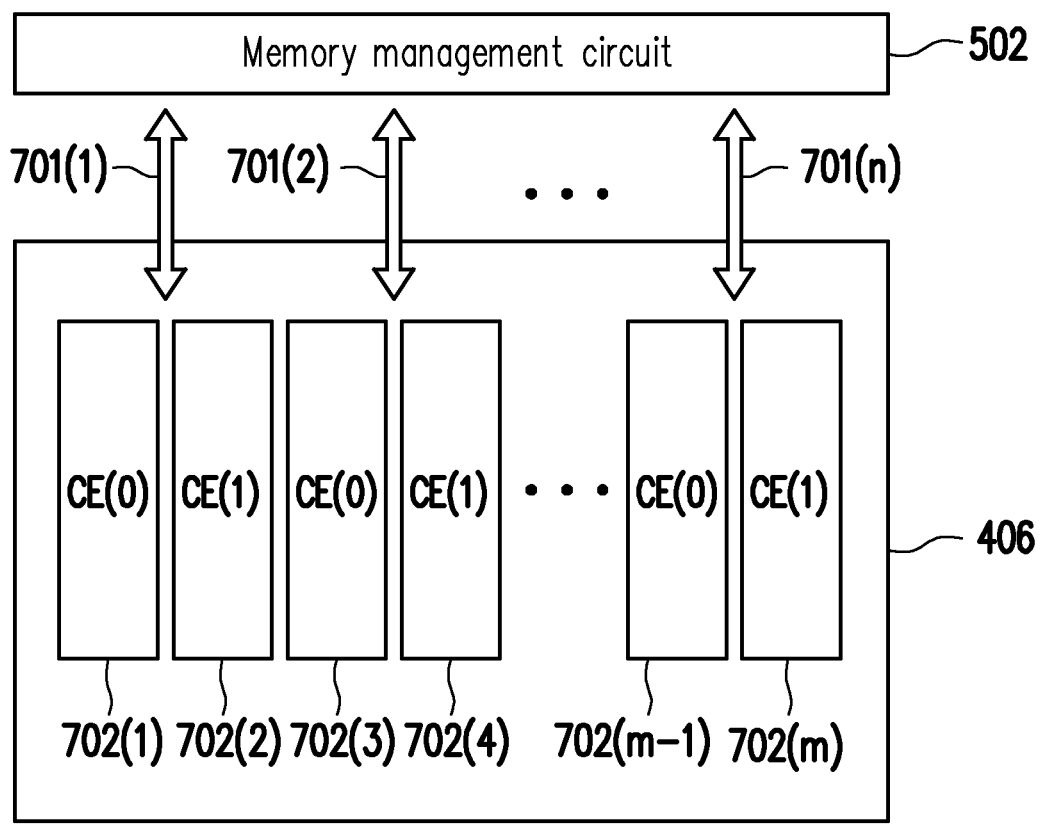
FIG. 7 is a schematic diagram illustrating management of a rewritable non-volatile memory module according to an exemplary embodiment of the disclosure.

FIG. 7 is a schematic diagram illustrating management of a rewritable non-volatile memory module according to an exemplary embodiment of the disclosure. With reference to FIG. 7, in this exemplary embodiment, the rewritable non-volatile memory module 406 includes CE regions 702(1) to 702(m). The memory management circuit 502 may access the CE regions 702(1) to 702(m) through channels 701(1) to 701(n). In addition, in this exemplary embodiment, it is assumed that each channel among the channels 701(1) to 701(n) corresponds to two CE regions (that is, CE(0) and CE(1)). For instance, the channel 701(1) corresponds to the CE regions 702(1) and 702(2), the channel 701(2) corresponds to the CE regions 702(3) and 702(4), and the rest may be deduced by analogy. The memory management circuit 502 may access the CE regions 702(1) and 702(2) through the channel 701(1) and may access the CE regions 702(3) and 702(4) through the channel 701(2), and the rest may be deduced by analogy.

In an exemplary embodiment, the memory management circuit 502 may receive data (aka first data) from the host system 11 shown in FIG. 1. In response to the memory storage device 10 being in a specific state (aka a first state), the memory management circuit 502 may send a write command sequence (aka a first write command sequence) to the rewritable non-volatile memory module 406. The first write command sequence may instruct the rewritable non-volatile memory module 406 to continuously write the first data to a plurality of CE regions (aka first CE regions) among the CE regions 702(1) to 702(m).

In an exemplary embodiment, the memory management circuit 502 may receive another data (aka second data) from the host system 11. In response to the memory storage device 10 being in a specific state (aka a second state), the memory management circuit 502 may send a write command sequence (aka a second write command sequence) to the rewritable non-volatile memory module 406. The second write command sequence may instruct the rewritable non-volatile memory module 406 to continuously write the second data to at least one CE region (aka at least one second CE region) among the CE regions 702(1) to 702(m). The first state is different from the second state. A data amount of the first data is equal to a data amount of the second data. A total number of the first CE regions is greater than a total number of the at least one second CE region. In addition, the first CE regions may not overlap or may at least partially overlap with the at least one second CE region.

In an exemplary embodiment, when receiving data from the host system 11, the memory management circuit 502 may determine that a current state of the memory storage device 10 is the first state or the second state. If the current state of the memory storage device 10 is the first state, the memory management circuit 502 may treat such data as the first data and sends out the first write command sequence to write the data. Alternatively, if the current state of the memory storage device 10 is the second state, the memory management circuit 502 may treat such data as the second data and sends out the second write command sequence to write the data.

In an exemplary embodiment, the memory management circuit 502 may determine whether the memory storage device 10 is in a period of execution of the data merge operation. The data merge operation includes moving of valid data in the rewritable non-volatile memory module 406. Note that operational details of the data merge operation are described above, and description thereof is not repeated. If the memory storage device 10 is in the period of execution of the data merge operation (that is, the data merge operation is started and is not yet ended), the memory management circuit 502 may determine that the memory storage device 10 is in the second state. Nevertheless, if the memory storage device 10 is not in the period of execution of the data merge operation (that is, one data merge operation is ended and the next data merge operation is not started yet), the memory management circuit 502 may determine that the memory storage device 10 is in the first state.

In an exemplary embodiment, in response to the memory storage device 10 being in the first state and using more (and/or a specific type of the) CE regions (i.e., the first CE regions) to write data, the memory storage device 10 may be regarded as providing more channels and/or CE regions for writing of external data when not executing the data merge operation. In this way, data accessing performance (e.g., data writing speed) of the memory storage device 10 may be improved as much as possible when the memory storage device 10 is not executing the data merge operation.

In an exemplary embodiment, in response to the memory storage device 10 being in the second state and using less (and/or a specific type of the) CE regions (i.e., the second CE region) to write data, the memory storage device 10 may be regarded as keeping at least part of the channels and/or CE regions for writing of external data when executing the data merge operation. In this way, stability of data writing performance (e.g., data writing speed) of the memory storage device 10 may be improved when the memory storage device 10 is executing the data merge operation.

Figure 8:
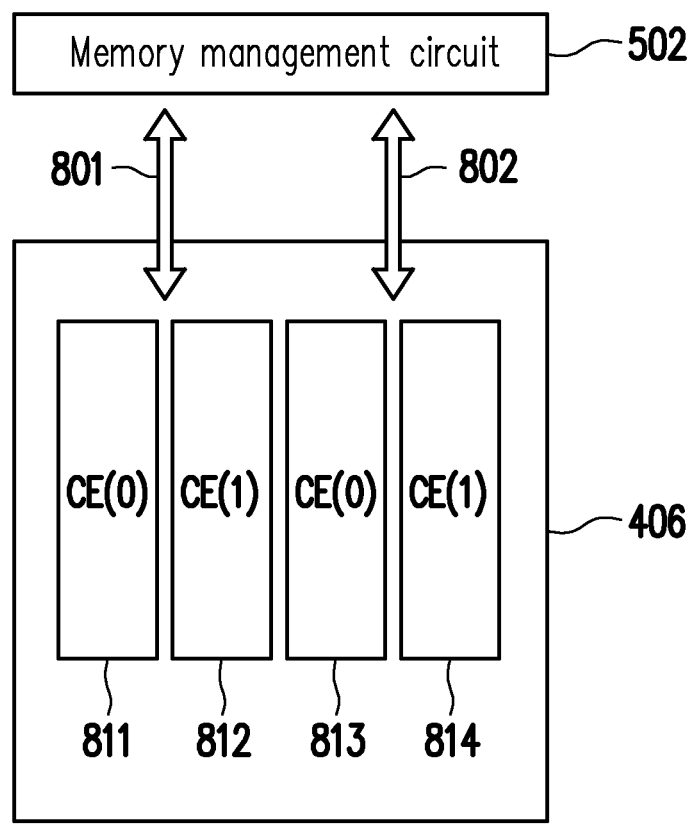
FIG. 8 is a schematic diagram illustrating management of a rewritable non-volatile memory module according to an exemplary embodiment of the disclosure.

FIG. 8 is a schematic diagram illustrating management of a rewritable non-volatile memory module according to an exemplary embodiment of the disclosure. With reference to FIG. 8, for ease of description, in this exemplary embodiment, accessing of CE regions 811 to 814 in the rewritable non-volatile memory module 406 is taken as an example. In this exemplary embodiment, the memory management circuit 502 may access the CE regions 811 and 812 through a channel 801 and may access the CE regions 813 and 814 through a channel 802. The CE regions 811 and 813 belong to CE(0) (aka a first-type CE region). The CE regions 812 and 814 belong to CE(1) (aka a second-type CE region).

Figure 9:
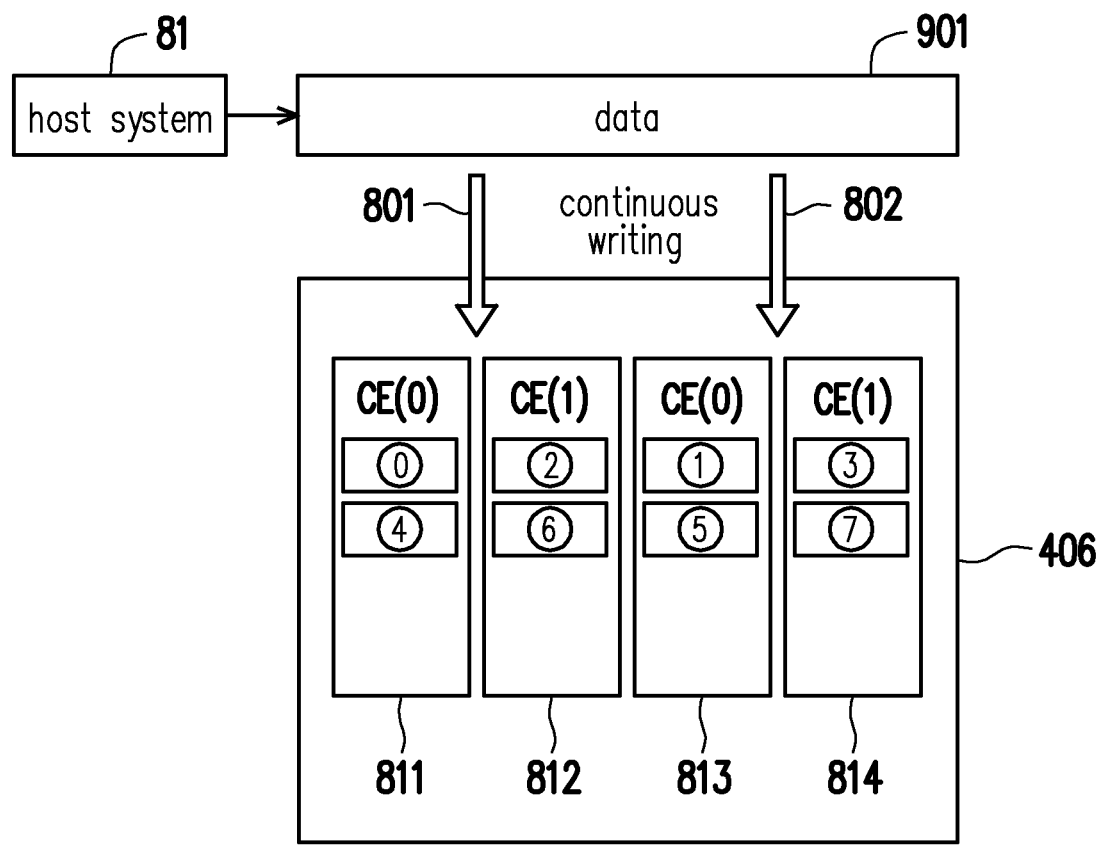
FIG. 9 is a schematic diagram illustrating storing of first data to first chip enabled (CE) regions according to an exemplary embodiment of the disclosure.

FIG. 9 is a schematic diagram illustrating storing of first data to first CE regions according to an exemplary embodiment of the disclosure. With reference to FIG. 9, the memory management circuit 502 may receive data 901 (aka first data) from a host system 81. The host system 81 may be identical to or similar to the host system 11 of FIG. 1.

In this exemplary embodiment, in response to the current state of the memory storage device 10 being the first state, the memory management circuit 502 may instruct the rewritable non-volatile memory module 406 to continuously write the data 901 to the CE regions 811 to 814. Note that a data writing order of the data 901 in the CE regions 811 to 814 may be represented by writing operations numbered 0 to 7 in FIG. 9. Taking FIG. 9 as an example, the data 901 may be sequentially written to a physical unit numbered 0 in the CE region 811, a physical unit numbered 1 in the CE region 813, a physical unit numbered 2 in the CE region 812, and a physical unit numbered 3 in the CE region 814, and the rest may be deduced by analogy.

In other words, in an exemplary embodiment of FIG. 9, the data 901 is continuously written to the 4 CE regions 811 to 814. The CE regions 811 to 814 include CE regions of different types (that is, CE(0) and CE(1)). For instance, the data 901 is written in CE regions of different types (that is, CE(0) and CE(1)) in an interleaving manner. For instance, in the writing operations numbered 0, 1, 4, and 5, part of data in the data 901 may be written in parallel to the CE regions 811 and 813 belonging to the first-type CE region (i.e., CE(0)). As an alternative, in the writing operations numbered 2, 3, 6, and 7, another part of data in the data 901 may be written in parallel to the CE regions 812 and 814 belonging to the second-type CE region (i.e., CE(1)). Note that in another exemplary embodiment of FIG. 9, the data 901 may be stored to the CE regions 811 to 814 (or more CE regions) based on other data writing orders, which is not particularly limited by the disclosure.

Figure 10:
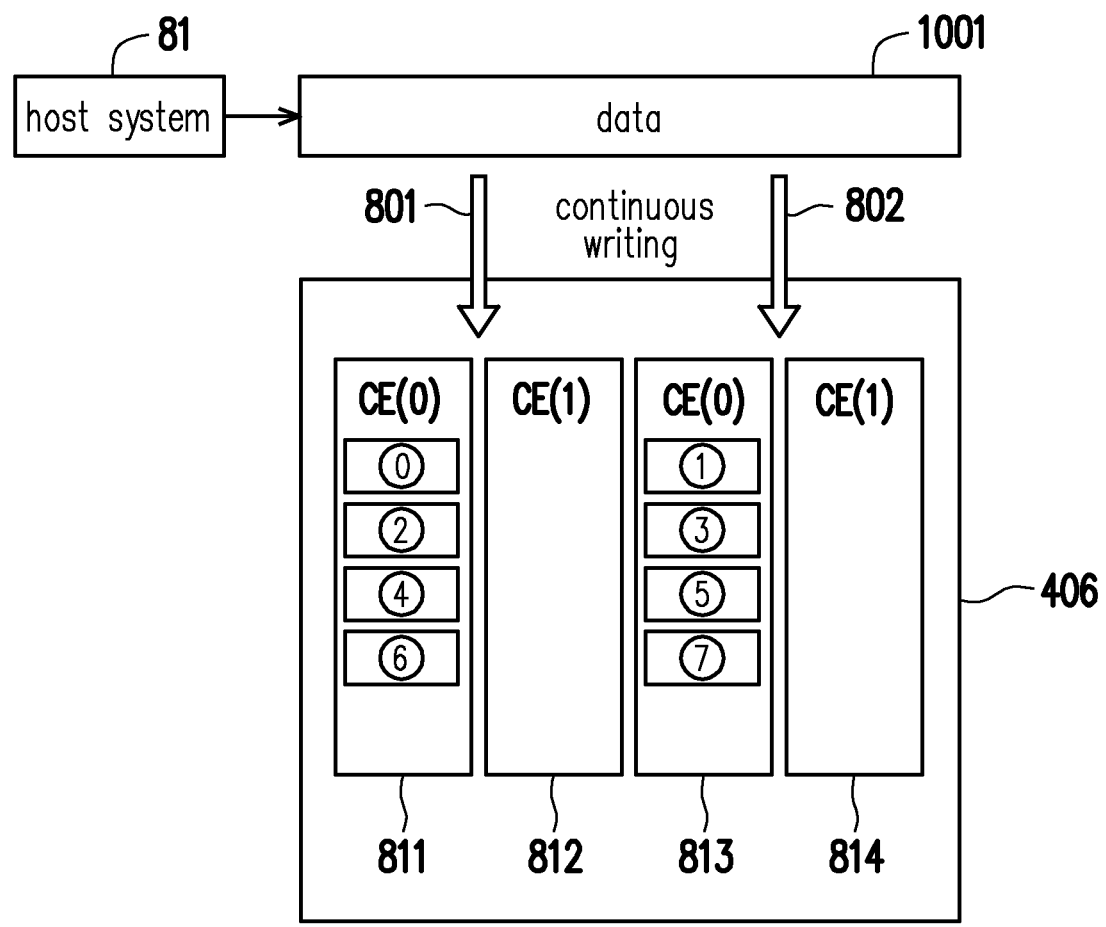
FIG. 10 is a schematic diagram illustrating storing of second data to second CE regions according to an exemplary embodiment of the disclosure.

FIG. 10 is a schematic diagram illustrating storing of second data to second CE regions according to an exemplary embodiment of the disclosure. With reference to FIG. 10, the memory management circuit 502 may receive data 1001 (aka second data) from the host system 81. Note that in this exemplary embodiment, a data amount of the data 1001 is identical to a data amount of the data 901 of FIG. 9. Nevertheless, in another exemplary embodiment, the data amount of the data 1001 may be different from the data amount of the data 901.

In this exemplary embodiment, in response to the current state of the memory storage device 10 being the second state, the memory management circuit 502 may instruct the rewritable non-volatile memory module 406 to continuously write the data 1001 to the CE regions 811 and 813. Note that a data writing order of the data 1001 in the CE regions 811 and 813 may be represented by writing operations numbered 0 to 7 in FIG. 10. As shown in FIG. 10, the data 1001 may be written to the physical units numbered 0 to 7 in the CE regions 811 and 813 in an interleaving manner.

Note that in an exemplary embodiment of FIG. 10, the data 1001 is continuously written to the 2 CE regions 811 and 813. Compared to the exemplary embodiment of FIG. 9, in the exemplary embodiment of FIG. 10, the data 1001 is written to less CE regions. Besides, the data writing order of the data 901 to the CE regions 811 to 814 in FIG. 9 is different from the data writing order of the data 1001 to the CE regions 811 and 813 in FIG. 10.

Note that in an exemplary embodiment of FIG. 10, the data 1001 is only written to the CE regions of the same type (or a single type), that is, the CE(0). Nevertheless, in another exemplary embodiment of FIG. 10, the data 1001 may also be written to more CE regions (e.g., the CE regions 811, 812, and 813) as long as the total number of the CE regions configured to store the data 1001 (i.e., the second CE region) is less than the total number of the CE regions configured to store the data 901 in FIG. 9 (i.e., the first CE regions).

Note that the exemplary embodiments of FIG. 9 and FIG. 10 may be treated as data writing operations selectively executed by the memory management circuit 502 at different time points. For instance, at one time point (aka a first time point), when the data 901 is received, the memory management circuit 502 may execute the data writing operation shown in the exemplary embodiments of FIG. 9. Nevertheless, at another time point (aka a second time point), when the data 1001 is received, the memory management circuit 502 may execute the data writing operation shown in the exemplary embodiments of FIG. 10. The first time point may be earlier or later than the second time point, which is not particularly limited by the disclosure.

Note that in the exemplary embodiments of FIG. 8 to FIG. 10, the presented structures of the CE regions and the data writing orders are examples only. In an embodiment that is not mentioned, data may also be written to CE regions corresponding to more channels and CE regions of more types (e.g., CE(2) and CE(3)), and/or different data writing orders may also be provided, which is not particularly limited by the disclosure.

In an exemplary embodiment, the memory management circuit 502 may mark a plurality of physical units (aka first physical units) configured to store the first data in the first CE regions as using a specific write mode (aka a first write mode) to store the first data. Taking FIG. 9 as an example, the memory management circuit 502 may mark the physical units numbered 0 to 7 (i.e., the physical units configured to store the data 901) as using the first write mode to store data.

In an exemplary embodiment, the memory management circuit 502 may also mark the first physical units as continuously storing the first data. Taking FIG. 9 as an example, the memory management circuit 502 may record information reflecting the data writing order of the first data to the first physical units to one or a plurality of physical units among the first physical units or to a management table. Thereafter, when the first data is required to be read, the memory management circuit 502 may query this information to obtain the data writing order of the first data to the first physical units.

In an exemplary embodiment, the memory management circuit 502 may mark a plurality of physical units (aka second physical units) configured to store the second data in the second CE region as using another write mode (aka a second write mode) to store the second data. The first write mode is different from the second write mode. Taking FIG. 10 as an example, the memory management circuit 502 may mark the physical units numbered 0 to 7 (i.e., the physical units configured to store the data 1001) as using the second write mode to store data.

In an exemplary embodiment, the memory management circuit 502 may also mark the second physical units as continuously storing the second data. Taking FIG. 10 as an example, the memory management circuit 502 may record information reflecting the data writing order of the second data to the second physical units to one or a plurality of physical units among the second physical units or to a management table. Thereafter, when the second data is required to be read, the memory management circuit 502 may query this information to obtain the data writing order of the second data to the second physical units.

In an exemplary example, in the data merge operation, the memory management circuit 502 may move the valid data according to a write mode corresponding to the valid data stored in the rewritable non-volatile memory module 406. In this way, continuity of the moved valid data is kept.

Figure 11:
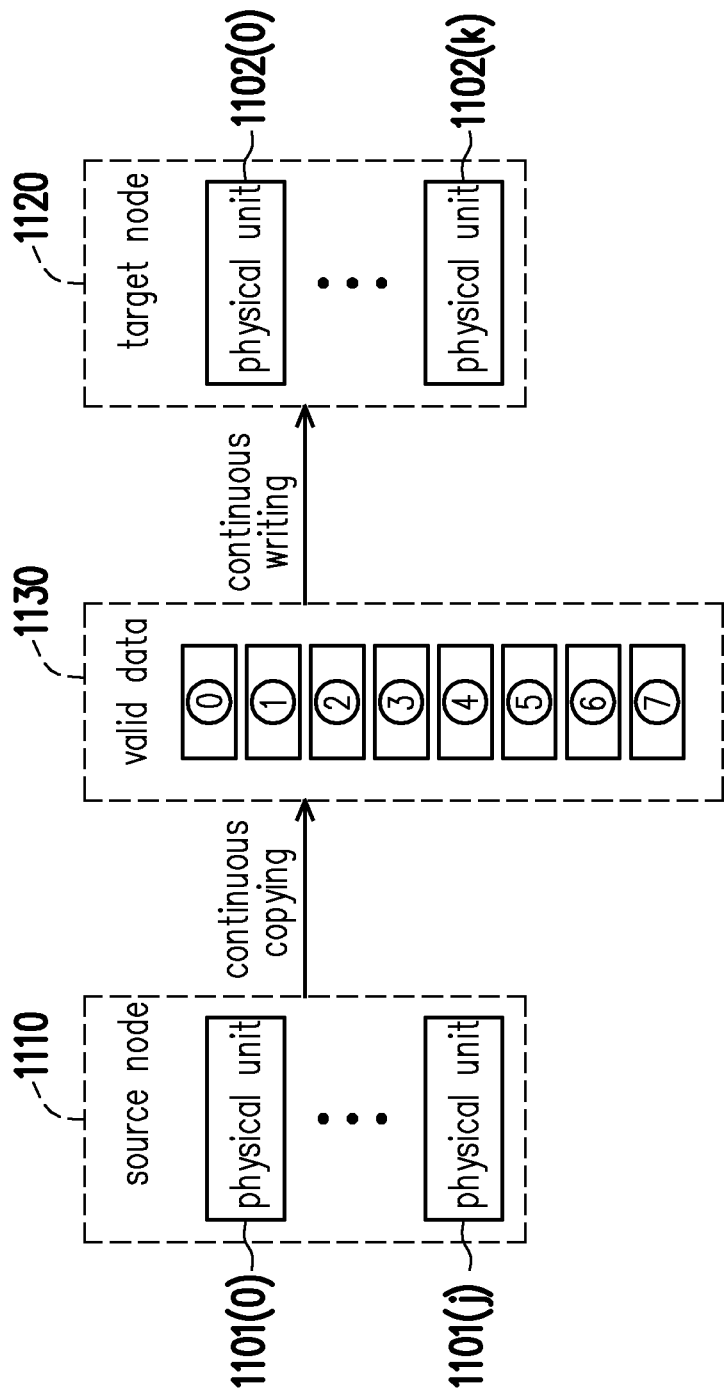
FIG. 11 is a schematic diagram illustrating a data merge operation according to an exemplary embodiment of the disclosure.

FIG. 11 is a schematic diagram illustrating a data merge operation according to an exemplary embodiment of the disclosure. With reference to FIG. 11, following the exemplary embodiments of FIG. 9 or FIG. 10, it is assumed that after the data 901 or 1001 is stored, one data merge operation is performed. In the data merge operation, the memory management circuit 502 may continuously move valid data 1130 including the data 901 or 1001 to a target node 1120. For instance, in this data merge operation, according to an original data writing order (numbered 0 to 7) of the valid data 1130, the valid data 1130 may be continuously copied from physical units 1101(0) to 1101(*j*) belonging to a source node 1110 and may be continuously written to physical units 1102(0) to 1102(*k*) belonging to the target node 1120. Therefore, the valid data 1130 which is moved to the target node 1120 may still retain its original data writing order. Thereafter, when the moved valid data 1130 is required to be read, the memory management circuit 502 may continuously read the valid data 1130 from the target node 1120, and a reading speed of the valid data 1130 may thus be accordingly increased.

Figure 12:
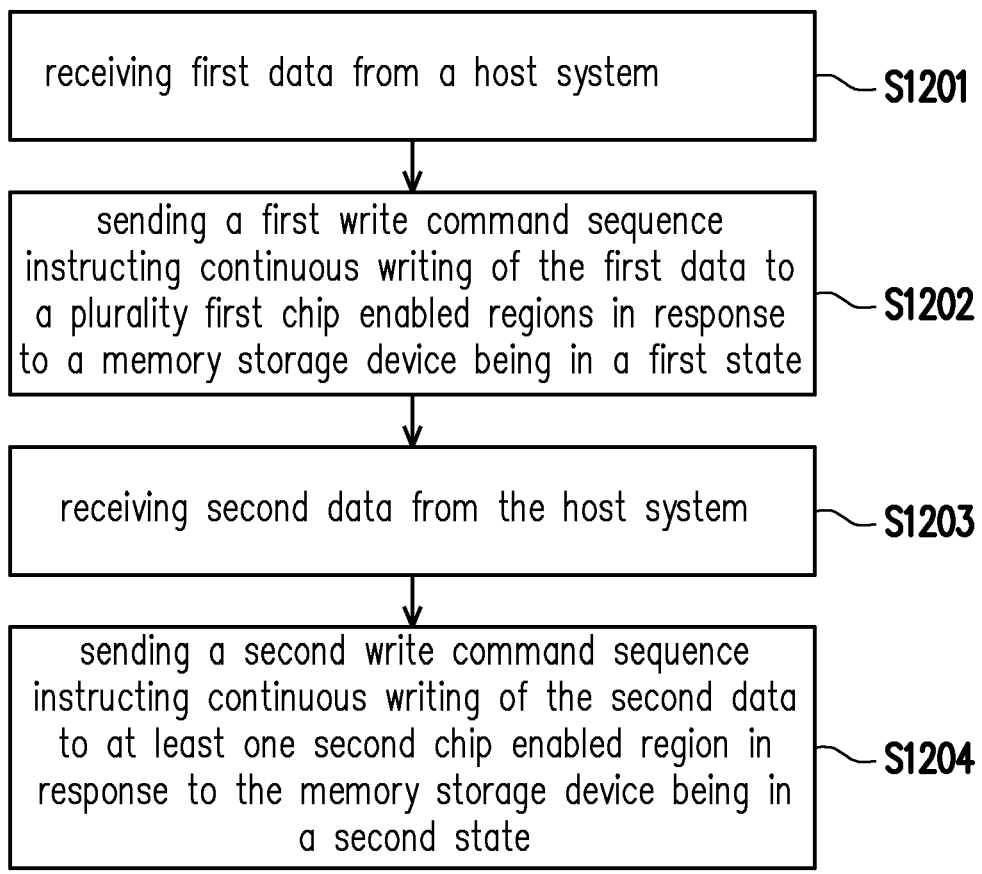
FIG. 12 is a flow chart illustrating a memory control method according to an exemplary embodiment of the disclosure.

FIG. 12 is a flow chart illustrating a memory control method according to an exemplary embodiment of the disclosure. With reference to FIG. 12, in step S1201, first data is received from a host system. In step S1202, a first write command sequence is sent in response to a memory storage device being in a first state. The first write command sequence instructs continuous writing of the first data to a plurality of first CE regions in the memory storage device. In step S1203, second data is received from the host system. In step S1204, a second write command sequence is sent in response to the memory storage device being in a second state. The second write command sequence instructs continuous writing of the second data to at least one second CE region in the memory storage device. Note that a data amount of the first data is equal to a data amount of the second data. A total number of the first CE regions is greater than a total number of the at least one second CE region.

Figure 13:
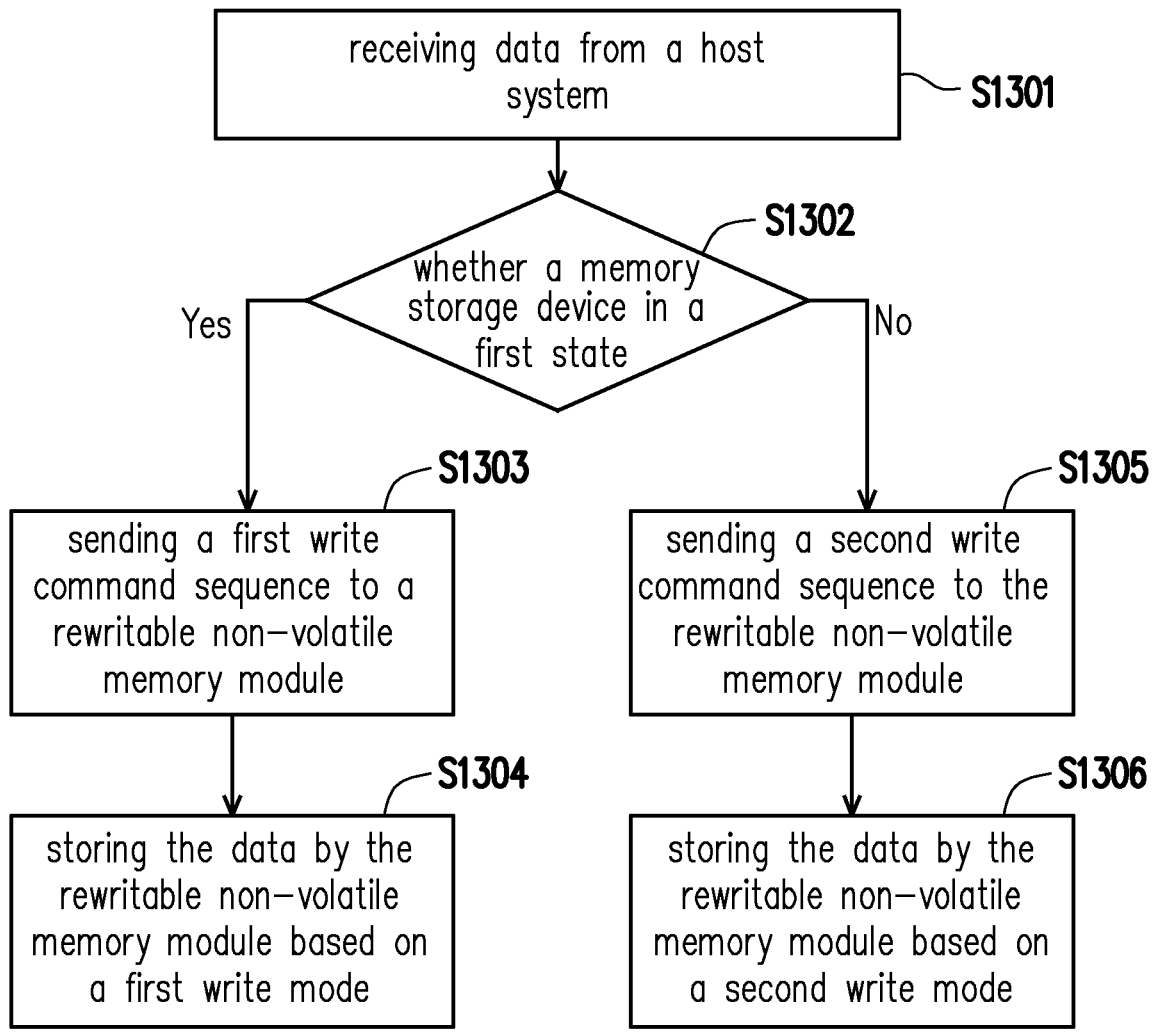
FIG. 13 is a flow chart illustrating a memory control method according to an exemplary embodiment of the disclosure.

FIG. 13 is a flow chart illustrating a memory control method according to an exemplary embodiment of the disclosure. With reference to FIG. 13, in step S1301, data is received from a host system. Such data is, for example, user data to be stored. In step S1302, it is determined that whether a memory storage device is in a first state (or a second state). If the memory storage device is in the first state, in step S1303, a first write command sequence is sent to a rewritable non-volatile memory module. In step S1304, according to the first write command sequence, the rewritable non-volatile memory module may store the data based on a first write mode. On the other hand, if the memory storage device is not in the first state (e.g., in the second state), in step S1305, a second write command sequence is sent to the rewritable non-volatile memory module. In step S1306, according to the second write command sequence, the rewritable non-volatile memory module may store the data based on a second write mode.

Nevertheless, each step of FIG. 12 and FIG. 13 has been specified as above and thus is not repeated hereinafter. It should be noted that each step of FIG. 12 and FIG. 13 may be implemented as a plurality of program codes or circuits. The disclosure is not limited thereto. In addition, the method of FIG. 12 and FIG. 13 may be used in combination with the above-described exemplary embodiments or be used solely, which is not particularly limited by the disclosure.

In view of the foregoing, in response to the memory storage device being in different states, the data from the host system may be continuously written to the CE regions of different numbers and/or of different types in the rewritable non-volatile memory module. By flexibly managing the rewritable non-volatile memory module (or the memory storage device) in different states in the memory storage device, the overall accessing performance of the memory storage device may be improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A memory control method, configured to control a memory storage device, wherein the memory storage device comprises a rewritable non-volatile memory module, the rewritable non-volatile memory module comprises a plurality of chip enabled regions connected to a plurality of channels for accessing the chip enabled regions, and the memory control method comprises:
   receiving first data from a host system;
   sending a first write command sequence in response to that the memory storage device is not performing a data merge operation in which valid data in the rewritable non-volatile memory module is moved for releasing at least one spared physical unit, wherein the first write command sequence instructs a continuous writing of a first part of the first data to a first part of a plurality first chip enabled regions among the chip enabled regions through the channels and then instructs a continuous writing of a second part of the first data to a second part of the first chip enabled regions through the channels, wherein the first part of the first chip enabled regions is different from the second part of the first chip enabled regions;
   receiving second data from the host system, wherein a data amount of the first data is equal to a data amount of the second data; and
   sending a second write command sequence in response to that the memory storage device is performing the data merge operation, wherein the second write command sequence instructs a continuous writing of the second data to at least one second chip enabled region among the chip enabled regions through at least one of the channels without using the second part of the first chip enabled regions.

2. The memory control method according to claim 1, further comprising:
   marking a plurality of first physical units configured to store the first data in the first chip enabled regions as using a first write mode to store the first data; and
   marking a plurality of second physical units configured to store the second data in the at least one second chip enabled region as using a second write mode to store the second data,
   wherein the first write mode is different from the second write mode.

3. The memory control method according to claim 2, further comprising:
   marking the first physical units as continuously storing the first data; and
   marking the second physical units as continuously storing the second data.

4. The memory control method according to claim 1, further comprising:
   moving the valid data according to a write mode corresponding to the valid data stored in the rewritable non-volatile memory module in the data merge operation to keep continuity of the moved valid data.

5. The memory control method according to claim 1, wherein a data writing order of the first data in the first chip enabled regions is different from a data writing order of the second data in the at least one second chip enabled region.

6. A memory storage device, comprising:
   a connection interface unit, configured to be coupled to a host system;
   a rewritable non-volatile memory module, comprising a plurality of chip enabled regions connected to a plurality of channels for accessing the chip enabled regions; and
   a memory control circuit unit, coupled to the connection interface unit and the rewritable non-volatile memory module,
   wherein the memory control circuit unit is configured to receive first data from the host system,
   the memory control circuit unit is further configured to send a first write command sequence in response to that the memory storage device is not performing a data merge operation in which valid data in the rewritable non-volatile memory module is moved for releasing at least one spared physical unit, wherein the first write command sequence instructs a continuous writing of a first part of the first data to a first part of a plurality first chip enabled regions among the chip enabled regions through the channels and then instructs a continuous writing of a second part of the first data to a second part of the first chip enabled regions through the channels, wherein the first part of the first chip enabled regions is different from the second part of the first chip enabled regions,
   the memory control circuit unit is further configured to receive second data from the host system, wherein a data amount of the first data is equal to a data amount of the second data,
   the memory control circuit unit is further configured to send a second write command sequence in response to that the memory storage device is performing the data merge operation, wherein the second write command sequence instructs a continuous writing of the second data to at least one second chip enabled region among the chip enabled regions through at least one of the channels without using the second part of the first chip enabled regions.

7. The memory storage device according to claim 6, wherein the memory control circuit unit is further configured to mark a plurality of first physical units configured to store the first data in the first chip enabled regions as using a first write mode to store the first data,
the memory control circuit unit is further configured to mark a plurality of second physical units configured to store the second data in the at least one second chip enabled region as using a second write mode to store the second data, and
the first write mode is different from the second write mode.

8. The memory storage device according to claim 7, wherein the memory control circuit unit is further configured to mark the first physical units as continuously storing the first data, and
the memory control circuit unit is further configured to mark the second physical units as continuously storing the second data.

9. The memory storage device according to claim 6, wherein the memory control circuit unit is further configured to move the valid data according to a write mode corresponding to the valid data stored in the rewritable non-volatile memory module in the data merge operation to keep continuity of the moved valid data.

10. The memory storage device according to claim 6, wherein a data writing order of the first data in the first chip enabled regions is different from a data writing order of the second data in the at least one second chip enabled region.

11. A memory control circuit unit, comprising:
a host interface, configured to be coupled to a host system;
a memory interface, configured to be coupled to a rewritable non-volatile memory module comprising a plurality of chip enabled regions connected to a plurality of channels for accessing the chip enabled regions; and
a memory management circuit, coupled to the host interface and the memory interface,
wherein the memory management circuit is configured to receive first data from the host system,
the memory management circuit is further configured to send a first write command sequence in response to that the memory storage device is not performing a data merge operation in which valid data in the rewritable non-volatile memory module is moved for releasing at least one spared physical unit, wherein the first write command sequence instructs a continuous writing of a first part of the first data to a first part of a plurality first chip enabled regions among the chip enabled regions through the channels and then instructs a continuous writing of a second part of the first data to a second part of the first chip enabled regions through the channels, wherein the first part of the first chip enabled regions is different from the second part of the first chip enabled regions,
the memory management circuit is further configured to receive second data from the host system, wherein a data amount of the first data is equal to a data amount of the second data,
the memory management circuit is further configured to send a second write command sequence in response to that the memory storage device is performing the data merge operation, wherein the second write command sequence instructs a continuous writing of the second data to at least one second chip enabled region among the chip enabled regions through at least one of the channels without using the second part of the first chip enabled regions.

12. The memory control circuit unit according to claim 11, wherein the memory management circuit is further configured to mark a plurality of first physical units configured to store the first data in the first chip enabled regions as using a first write mode to store the first data,
the memory management circuit is further configured to mark a plurality of second physical units configured to store the second data in the at least one second chip enabled region as using a second write mode to store the second data, and
the first write mode is different from the second write mode.

13. The memory control circuit unit according to claim 12, wherein the memory management circuit is further configured to mark the first physical units as continuously storing the first data, and
the memory management circuit is further configured to mark the second physical units as continuously storing the second data.

14. The memory control circuit unit according to claim 11, wherein the memory management circuit is further configured to move the valid data according to a write mode corresponding to the valid data stored in the rewritable non-volatile memory module in the data merge operation to keep continuity of the moved valid data.

15. The memory control circuit unit according to claim 11, wherein a data writing order of the first data in the first chip enabled regions is different from a data writing order of the second data in the at least one second chip enabled region.

* * * * *